(12) United States Patent
Okabe et al.

(10) Patent No.: US 12,553,915 B2
(45) Date of Patent: Feb. 17, 2026

(54) AUTOMATIC ANALYZER

(71) Applicant: Hitachi High-Tech Corporation, Tokyo (JP)

(72) Inventors: Shugo Okabe, Tokyo (JP); Takenori Okusa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 927 days.

(21) Appl. No.: 17/609,940

(22) PCT Filed: Feb. 25, 2020

(86) PCT No.: PCT/JP2020/007332
§ 371 (c)(1),
(2) Date: Nov. 9, 2021

(87) PCT Pub. No.: WO2020/235163
PCT Pub. Date: Nov. 26, 2020

(65) Prior Publication Data
US 2022/0206028 A1    Jun. 30, 2022

(30) Foreign Application Priority Data

May 17, 2019 (JP) .................................. 2019-093651

(51) Int. Cl.
*G01N 35/10* (2006.01)
*G01N 1/38* (2006.01)
*G01N 1/44* (2006.01)

(52) U.S. Cl.
CPC ........... *G01N 35/1002* (2013.01); *G01N 1/38* (2013.01); *G01N 1/44* (2013.01); *G01N 2035/1025* (2013.01)

(58) Field of Classification Search
CPC ........ G01N 35/1002; G01N 1/38; G01N 1/44; G01N 2035/1025; G01N 35/025;
(Continued)

(56) References Cited

U.S. PATENT DOCUMENTS 4,344,768 A   8/1982   Parker et al.
4,774,055 A   9/1988   Wakatake et al.
(Continued)

FOREIGN PATENT DOCUMENTS

EP   2927694 A   10/2015
EP   3382396 A   10/2018
(Continued)

OTHER PUBLICATIONS

Extended European Search Report issued on Oct. 12, 2023 for European Patent Application No. 20810213.7.
International Search Report, PCT/JP2020/007332, May 26, 2020, 3 pgs.
International Preliminary Report of Patentability (Chaper II of the Patent Cooperation Treaty), PCT/JP2020/007332, Mar. 26, 2021, 4 pgs.
(Continued)

*Primary Examiner* — Dean Kwak
(74) *Attorney, Agent, or Firm* — Volpe Koenig

(57) ABSTRACT

Provided is an automatic analyzer with improved analysis accuracy and analysis processing capacity per unit space. The automatic analyzer includes a reagent container with an opening on an upper side, a first arm that rotates centering around a first shaft, a tip of the first arm accessing to the upper side of the reagent container, and a second arm that rotates centering around a second shaft, a tip of the second arm accessing to the upper side of the reagent container. A recess is formed on a side that is closer to the tip of the first arm than the first shaft and that faces the second arm.

5 Claims, 6 Drawing Sheets

(58) Field of Classification Search
CPC ....... G01N 2035/0443; G01N 35/1011; G01N 35/10; G01N 35/1065; G01N 35/109; G01N 35/1067; G01N 35/02; G01N 35/04; G01N 35/06; B01L 2200/16; B01L 3/502; B01L 3/527; B01F 11/00; B01F 11/04

See application file for complete search history.

(56) References Cited

U.S. PATENT DOCUMENTS

| | | | |
|---|---|---|---|
| 5,517,867 | A | 5/1996 | Ely et al. |
| 5,807,523 | A * | 9/1998 | Watts ............... G01N 35/00594 366/168.1 |
| 2007/0020145 | A1 * | 1/2007 | Oonuma ............ G01N 35/1009 422/64 |
| 2015/0355210 | A1 | 12/2015 | Matsumoto |
| 2018/0364267 | A1 | 12/2018 | Shinohara |
| 2019/0041366 | A1 | 2/2019 | Kawakami |
| 2019/0041416 | A1 | 2/2019 | Dunfee et al. |

FOREIGN PATENT DOCUMENTS

| | | |
|---|---|---|
| JP | 01-140166 U | 9/1989 |
| JP | 07-239336 A | 9/1995 |
| JP | 08-54400 A | 2/1996 |
| JP | 2000-213978 A | 8/2000 |
| JP | 2000-266762 A | 9/2000 |
| JP | 2003-004731 A | 1/2003 |
| JP | 2003-172739 A | 6/2003 |
| JP | 2007-315972 A | 12/2007 |
| JP | 2010-101677 A | 5/2010 |
| JP | 2011-227092 A | 11/2011 |
| JP | 3188929 U | 2/2014 |
| JP | 2014-228318 A | 12/2014 |
| JP | 2019-28019 A | 2/2019 |

OTHER PUBLICATIONS

Partial European Search Report issued on Jun. 23, 2023 for European Patent Application No. 20810213.7.

* cited by examiner

[FIG. 1]
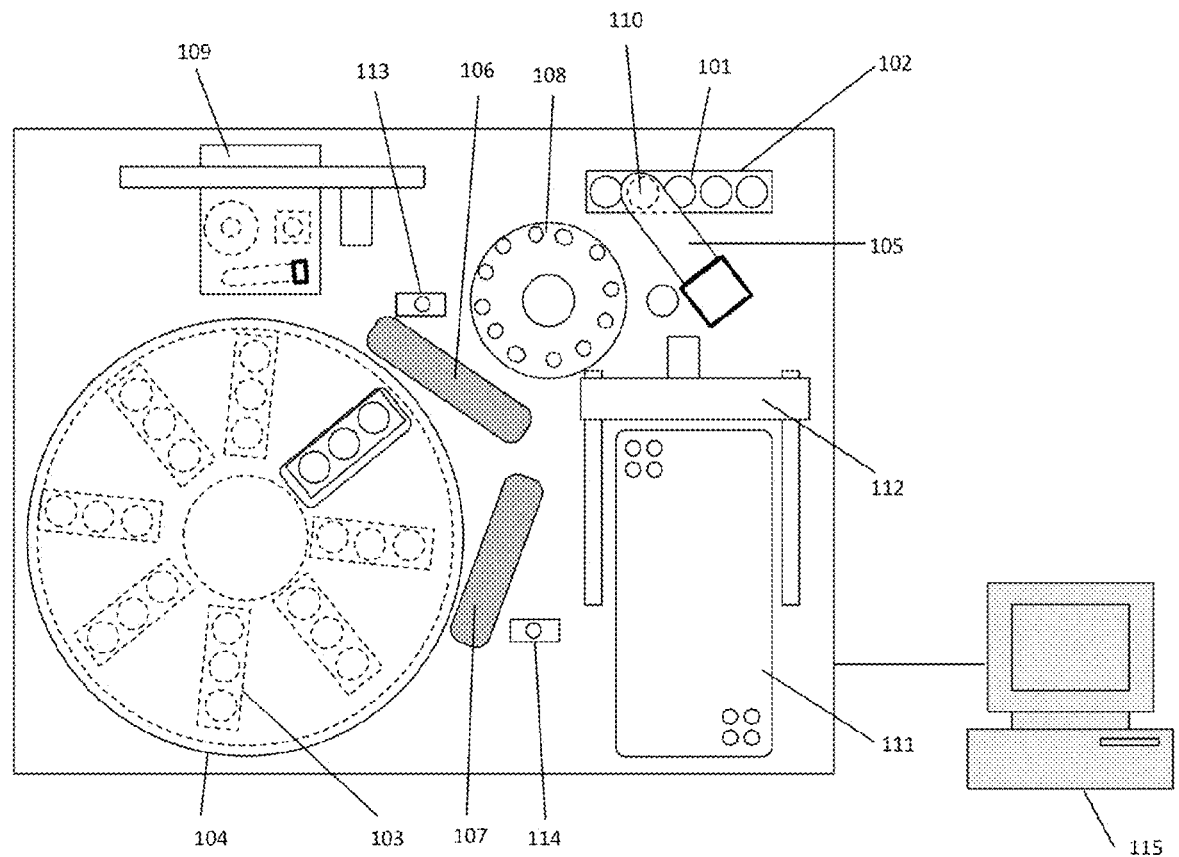

[FIG. 2]
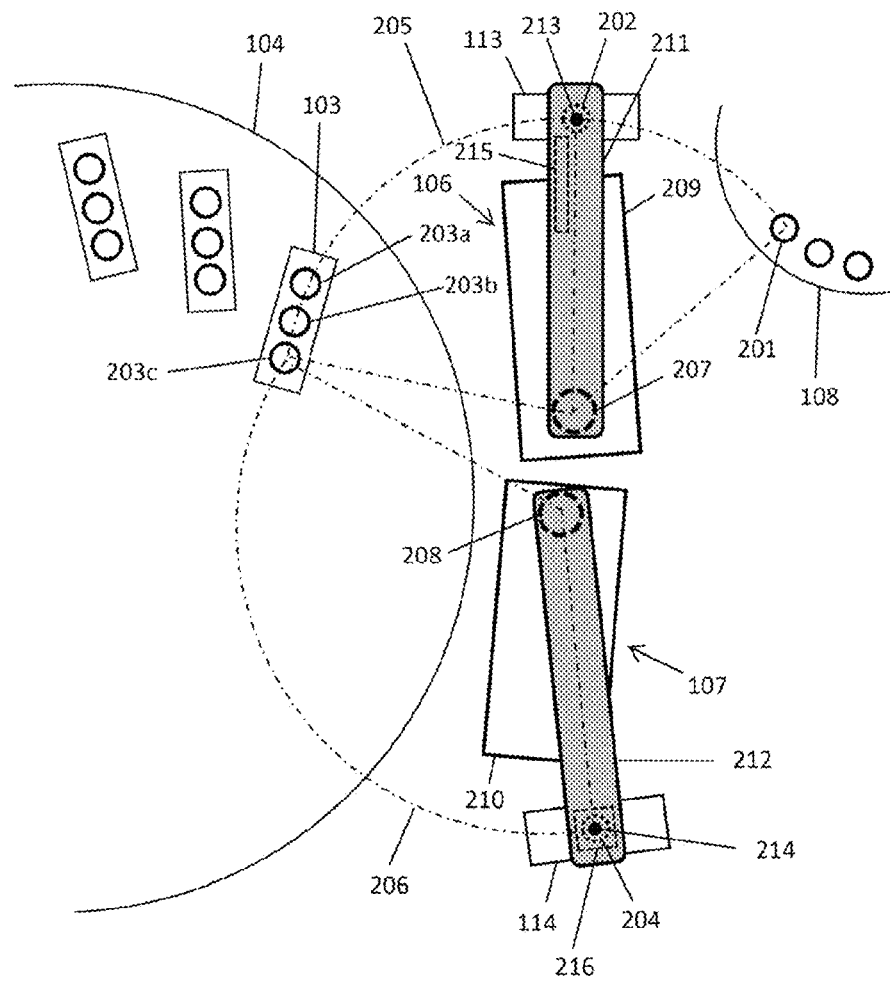

[FIG. 3]
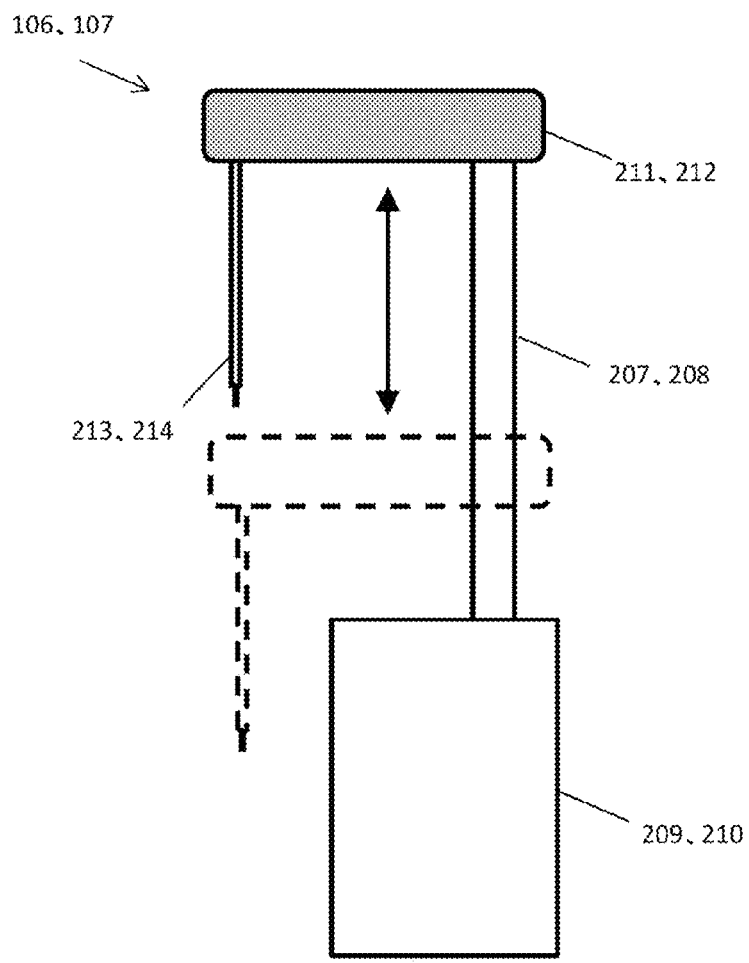

[FIG. 4]
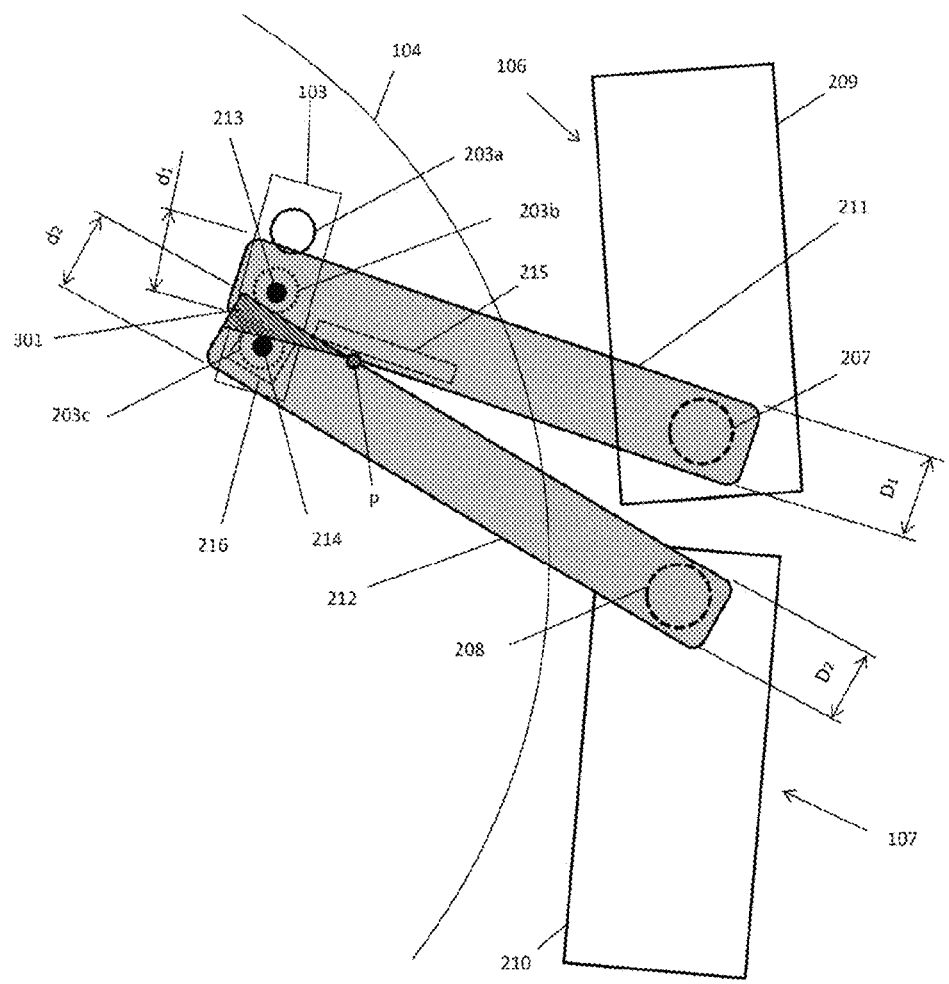

[FIG. 5]
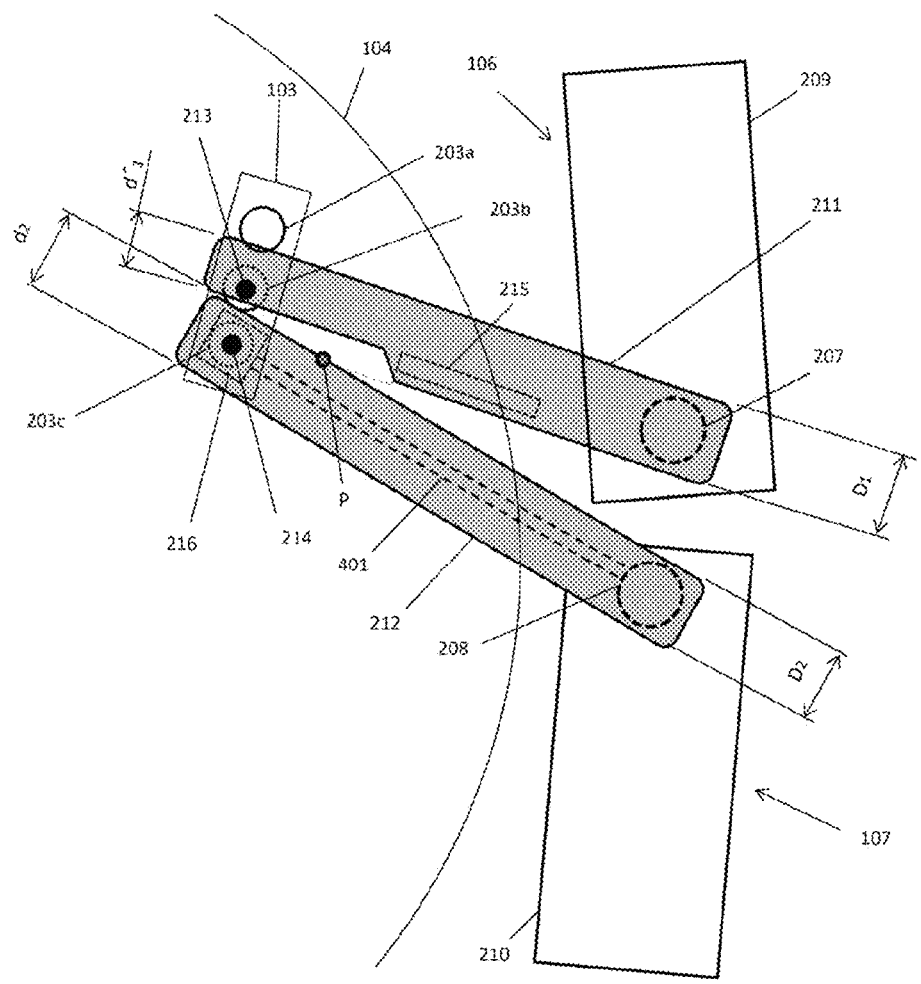

[FIG. 6]
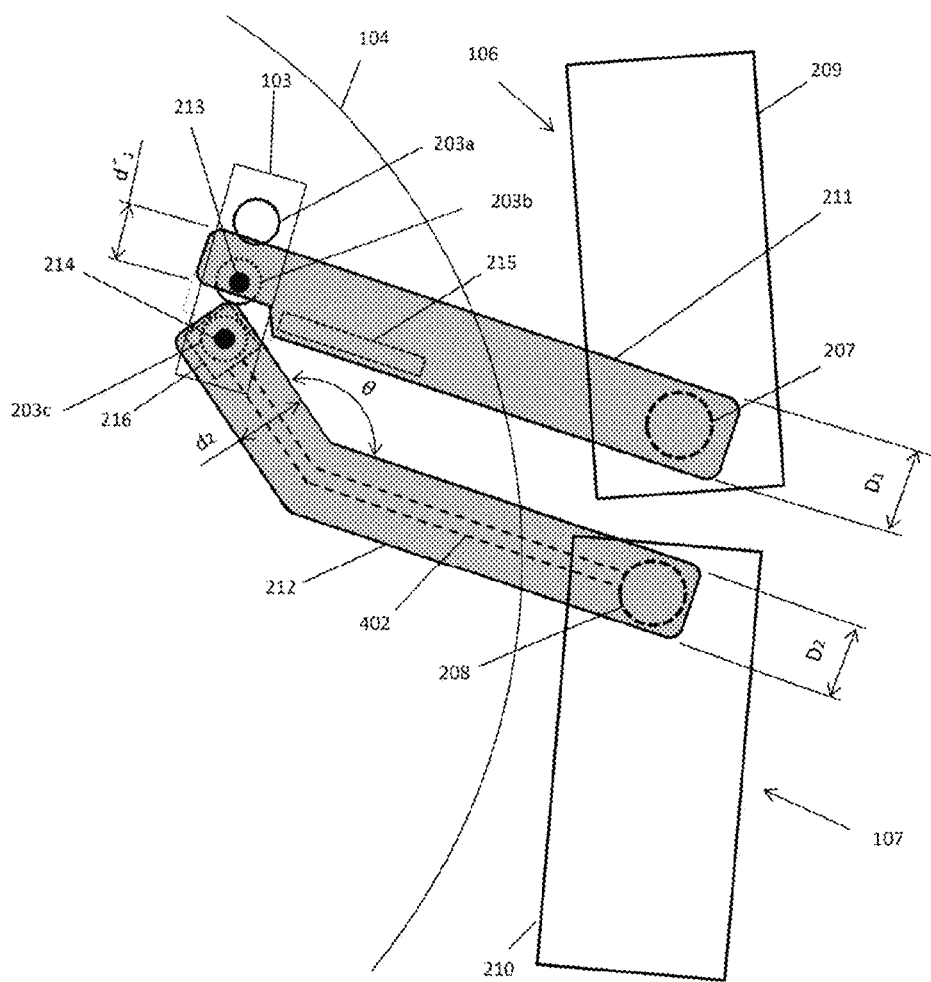

AUTOMATIC ANALYZER

TECHNICAL FIELD

The present invention relates to an automatic analyzer.

BACKGROUND ART

In a clinical automatic analyzer, there is a strong demand for reducing an operation cost when the analyzer is used, and as one of the demands, there is a demand for increasing an analysis processing capacity per unit space with respect to a space occupied at a time of installing the analyzer. For example, the following PTL 1 discloses that "by simultaneously positioning the stirring paddle and the reagent dispensing probe toward the upper sides of the reagent containers, the time lag between the stirring step and the dispensing step can be made very small, and the throughput of the automatic analyzer can be improved" (paragraph 0055 of PTL 1).

CITATION LIST

Patent Literature

PTL 1: JP-A-2014-228318

SUMMARY OF INVENTION

Technical Problem

However, in the technique described in PTL 1, since a unit of the stirring paddle and a unit of the reagent dispensing probe are located at relatively distant positions, a size of the analyzer is increased, and it is difficult to improve the analysis processing capacity per unit space.

Further, in a case where an arm such as the stirring paddle or the reagent dispensing probe is operated at a high speed, if a rigidity of each arm is low, a stopping accuracy of a tip of each arm may be reduced, and an analysis result may be affected.

An object of the invention is to provide an automatic analyzer with improved analysis accuracy and analysis processing capacity per unit space.

Solution to Problem

In order to solve the above problems, an automatic analyzer according to the invention includes a reagent container with an opening on an upper side, a first arm that rotates centering around a first shaft, a tip of the first arm accessing to the upper side of the reagent container, and a second arm that rotates centering around a second shaft, a tip of the second arm accessing to the upper side of the reagent container. A recess is formed on a side that is closer to the tip of the first arm than the first shaft and that faces the second arm.

Advantageous Effect

According to the invention, an automatic analyzer with improved analysis accuracy and analysis processing capacity per unit space can be provided.

BRIEF DESCRIPTION OF DRAWINGS

FIG. 1 is a schematic configuration diagram of an automatic analyzer.

FIG. 2 is a plan view showing an arrangement of a reagent dispensing unit and a stirring unit.

FIG. 3 is a schematic side view of the reagent dispensing unit (the stirring unit).

FIG. 4 is a plan view showing interference between a dispensing arm and a stirring arm.

FIG. 5 is a plan view showing a structure of a dispensing arm and a stirring arm according to a first embodiment.

FIG. 6 is a plan view showing a structure of a dispensing arm and a stirring arm according to a second embodiment.

DESCRIPTION OF EMBODIMENTS

As an embodiment of the invention, an immune analyzer that is an example of an automatic analyzer will be described.

FIG. 1 is a schematic configuration diagram of the automatic analyzer according to the present embodiment.

The automatic analyzer includes a sample transport unit 102 that transports a sample container 101 such as a blood collection tube in which a sample to be analyzed is accommodated to a sample aspiration position 110, a reagent storage unit 104 that controls a temperature of a reagent container 103 in which a reagent to be used for analysis is contained such that a temperature of the reagent is within a certain range, a sample dispensing unit 105 that dispenses the sample in the sample container 101 into a reaction container, a reagent dispensing unit 106 that dispenses the reagent in the reagent container 103 into the reaction container, a stirring unit 107 that stirs particles or the like in a liquid in the reagent container 103 with an opening on an upper side, a reaction promotion unit 108 that controls a reaction liquid in which the sample and the reagent are mixed within a certain temperature range by setting the reaction container in which the reaction liquid is accommodated, and a measurement unit 109 that optically measures a quantity of a substance in the reaction liquid in which a reaction is promoted by the reaction promotion unit. In addition, in order to measure a temperature of a surrounding environment in which the automatic analyzer is disposed, an environmental temperature measurement sensor (not shown) is disposed. Further, these units are controlled by a control device 115.

The sample transport unit 102 is a sample rack on which one or a plurality of sample containers 101 are mounted, or may be a sample disk arranged on a circumference of the disk. In a case of the sample rack, the sample rack is transported to an aspiration position of the sample dispensing unit by a transport device such as a transport belt mechanism or a robot arm.

The reagent storage unit 104 is configured such that a plurality of reagent containers 103 are disposed on a circumference thereof, and any reagent container is transported to a desired position by being rotated, and may also be configured such that the reagent containers are disposed in one row or a plurality of rows vertically and horizontally.

The measurement unit 109 performs optical measurement on the reaction liquid in a measurement flow path, and at this time, the measurement is performed in a state where the reaction liquid in the flow path is controlled within a certain temperature range. Examples of the measurement operation include measurement of absorbance of the reaction liquid, measurement of a light emission amount when the reagent is added to the reaction liquid or a voltage is applied thereto, measurement of the number of the particles in the reaction liquid, and measurement of variations in a current value or a voltage value when the reaction liquid comes into contact with an electrode film. Therefore, in the measurement unit 109, a light measuring machine such as a photomultiplier tube or a photometer, an imaging element such as a CCD, an ammeter or a voltmeter for measuring the variations in the current value or the voltage value, and the like are provided.

The reaction promotion unit 108 maintains a temperature of the reaction container within a predetermined temperature range, thereby allowing a stable reaction to proceed. Specifically, the reaction promotion unit 108 is an incubator that performs the temperature control by heating a surrounding with a heater in a state where the plurality of reaction containers are disposed on the circumference. As another example of the reaction promotion unit 108, the reaction promotion unit 108 may be a thermostatic bath in which the reaction containers are immersed with a liquid controlled to have a certain temperature range circulating therein.

The sample dispensing unit 105 dispenses the sample in the sample container 101 into the reaction container, and it is necessary to consider an influence of carry-over between the samples depending on an analysis performance required for the analyzer. Therefore, a dispensing tip that can be replaced every time the sample is changed is used at a portion that comes into contact with the sample when the sample dispensing unit 105 dispenses the sample, or an unused reaction container is used every time the sample is changed. At this time, the dispensing tip used once or the reaction container used once is discarded. The new dispensing tips and the new reaction containers necessary for performing analysis for a certain time are stored in a consumable storage unit 111, and are supplied to a place where the dispensing tip and the reaction container are used by a consumable transport unit 112 as appropriate. Further, the reagent dispensing unit 106 and the stirring unit 107 include a reagent dispensing nozzle cleaning unit 113 and a stirring rod cleaning unit 114 that clean an immersion portion in the reagent in consideration of the influence of carry-over.

Next, operations of the reagent dispensing unit 106 and the stirring unit 107 will be described with reference to FIGS. 2 to 4.

FIG. 2 is a plan view showing an arrangement example of the reagent container 103, the reagent storage unit 104, the reagent dispensing unit 106, the stirring unit 107, the reaction promotion unit 108, the reagent dispensing nozzle cleaning unit 113, and the stirring rod cleaning unit 114 on the analyzer. FIG. 3 is a side view showing simplification of the reagent dispensing unit 106 and the stirring unit 107. The arrangement of the units is desirably as close as possible in order to implement space saving and high processing capacity. In particular, since reagent dispensing processing is frequently required in the analysis processing, it is desirable that the arrangement of the reagent storage unit 104, the reaction promotion unit 108, and the reagent dispensing unit 106 is necessarily close to each other. Further, it is desirable that the arrangement of the reagent dispensing nozzle cleaning unit 113, the stirring unit 107, and the stirring rod cleaning unit 114 is close to that of the reagent dispensing unit 106 and the like.

The reagent dispensing unit 106 includes a dispensing nozzle 213 that aspirates and discharges the reagent, a driving unit 209 mainly configured with an actuator or a sensor, a shaft 207 that transmits power from the driving unit 209, a dispensing arm (first arm) 211 that connects the shaft (first shaft) 207 and the dispensing nozzle 213, and a liquid level detection sensor 215 stored in the dispensing arm 211. Herein, a shape of the dispensing arm 211 is determined such that a distance between the shaft 207 and the dispensing nozzle 213 comes to be equal to each of distances from the shaft 207 to each opening of reagent container (reagent aspiration position) 203a, 203b, and 203c and a distance from the shaft 207 to a reagent discharge position 201. Meanwhile, in order to reduce displacement of the tip of the dispensing nozzle 213 during operation, it is effective to ensure structural rigidity of the dispensing arm 211, that is, it is desirable to shorten the distance between the shaft 207 and the dispensing nozzle 213 as much as possible. Further, by forming the dispensing arm 211 to be small, weight reduction suitable for a high-speed operation can be implemented, and an advantage that the occupied space at the time of operation can be reduced can be obtained. In contrast, occupied spaces of the reagent storing unit 104 and the reaction promotion unit 108 are generally increased in proportion to processing capacity of the analyzer. Therefore, the distance between the shaft 207 and the dispensing nozzle 213 may be required to be long, and there is also a method of ensuring the structural rigidity by increasing a diameter of the shaft or a length of each arm in a lateral direction.

The reagent dispensing unit 106 can cause the dispensing nozzle 213 at the tip to access to the upper side of the predetermined reagent container 103 by rotating the dispensing arm 211 about the shaft 207. Herein, the reagent discharge position 201, the openings of reagent container (reagent aspiration positions) 203a, 203b, and 203c, and a dispensing nozzle cleaning position 202 are scattered on a movement path 205 of the dispensing nozzle 213. Then, after the dispensing nozzle 213 is moved to a position immediately above each position, the shaft 207 slides up and down to control the dispensing nozzle 213 to a desired height, thereby performing aspiration, discharge, and cleaning. The dispensing arm 211 is provided with the liquid level detection sensor 215 that detects a liquid level in contact with the tip of the dispensing nozzle 213. The liquid level detection sensor 215 is used to determine a position at which a downward movement is stopped in the aspiration operation or to grasp a liquid amount in the reagent container 103. The liquid level detection sensor 215 and the dispensing nozzle 213 are connected by an electric wiring. At this time, if the wiring to be connected is long, crosstalk from adjacent wirings or a vibration during the operation may lead to disturbance of a detection signal. Therefore, it is desirable that the liquid level detection sensor 215 and the dispensing nozzle 213 are disposed as close as possible to each other.

The stirring unit 107 includes a stirring rod 214 that stirs the reagent, a driving unit 210 mainly configured with the actuator or the sensor, a shaft (second shaft) 208 that transmits power from the driving unit 210, a stirring arm (second arm) 212 that connects the shaft 208 and the stirring rod 214, and a stirring rod driving unit 216 stored in the stirring arm 212 and connected to the stirring rod 214. Similarly to the dispensing arm 211, in order to reduce the displacement of a tip of the stirring rod 214 during the operation, it is effective to ensure structural rigidity of the stirring arm 212, that is, it is desirable to shorten the distance between the shaft 208 and the stirring rod 214 as much as possible. Further, by forming the stirring arm 212 to be small, the weight reduction suitable for the high-speed operation can be implemented, and the advantage that the occupied space at the time of operation can be reduced can be obtained. Here, specific examples of components of the stirring rod driving unit 216 include an actuator for rotationally driving the stirring rod 214 and a sensor for controlling the rotation. In general, the actuator such as a motor is a heavy object of about several tens of grams even if it is small. Therefore, the structural rigidity of the stirring arm 212 on which the heavy object is mounted at the arm tip is more obtained than that of the dispensing arm 211.

The stirring unit 107 can cause the stirring rod 214 at the tip to access to the upper side of the predetermined reagent container 103 by rotating the stirring arm 212 about the shaft 208. Herein, the opening of reagent container (reagent stirring position) 203c and a stirring rod cleaning position 204 are scattered on a movement path 206 of the stirring rod 214. Then, after the stirring rod 214 is moved to a position immediately above each position, the shaft 208 slides up and down to control the stirring rod 214 to a desired height, thereby performing the stirring and the cleaning. It should be noted that the stirring rod 214 includes a stirring blade at the tip thereof. The stirring of the reagent is performed by immersing the stirring blade in the reagent liquid and rotating the stirring rod by the stirring rod driving unit 216. In the present embodiment, the opening of reagent container 203c of the reagent container 103 is the reagent stirring position, and the stirring unit 107 is disposed at a position as close as possible to the reagent container opening 203c, whereas the invention is not limited thereto depending on a shape of the reagent container and the stirring position. Further, similar to the dispensing arm 211, by forming the stirring arm 212 to be small, the weight reduction suitable for the high-speed operation can be implemented, and the advantage that the occupied space at the time of operation can be reduced can be obtained.

As described above, it is desirable that lengths of the dispensing arm 211 and the stirring arm 212 in a longitudinal direction is as short as possible, whereas there is also a case where the lengths need to be increased depending on a space occupied by a peripheral unit. Further, regarding lengths D1 and D2 in the lateral direction, in particular, in the vicinity where the shaft is connected, a length in consideration of rigidity and strength against the vibration and an inertial force at the time of driving is required, and thus the length also increases in proportion to an increase in an operation speed. Since a weight of the arm inevitably increases as the arm becomes larger, as for the shape of the arm, it is necessary to reduce the weight of the arm in accordance with the high-speed operation while maintaining the structural rigidity of the arm.

Further, in the automatic analyzer according to the present embodiment, the dispensing nozzle 213 and the stirring rod 214 may simultaneously access the upper sides of the adjacent reagent containers 103 among the plurality of (three) reagent containers 103 arranged radially. Specifically, as shown in FIG. 4, the dispensing nozzle 213 may access the opening of reagent container 203b and the stirring rod 214 may access the opening of reagent container 203c at the same time. At this time, a tip side of the dispensing arm 211 and a tip side of the stirring arm 212 are closest to each other. In contrast, when a length d1 of the dispensing arm 211 in the lateral direction in the vicinity of the dispensing nozzle 213 and the length D1 of the dispensing arm 211 in the vicinity of the shaft are equal to each other, and a length d2 of the stirring arm 212 in the lateral direction in the vicinity of the stirring rod 214 and the length D2 of the stirring arm 212 in the vicinity of the shaft are equal to each other, the dispensing arm 211 and the stirring arm 212 interfere with each other in the vicinity of the tip of each arm (interference region 301). An intersection point closest to the shafts 207 and 208 in the interference region 301 is defined as a point P.

Hereinafter, a configuration for preventing the interference between the arms even when the plurality of arms are moved close to each other while maintaining the rigidity of the arms even when the arms are operated at a high speed will be described with reference to first and second embodiments.

First Embodiment

FIG. 5 is a plan view showing a structure of the dispensing arm 211 and the stirring arm 212 according to a first embodiment. As for a shape of the dispensing arm 211, a length d'1 in a lateral direction in the vicinity of a tip of the dispensing nozzle 213 satisfies d'1<D1. At this time, a region in a longitudinal direction, which is d'1, extends from the tip of the dispensing arm to a position closer to the shaft than the point P. Accordingly, interference between the dispensing nozzle 213 and the stirring arm 212 can be avoided. Further, since a part of the dispensing arm 211 is cut out to have a thin shape, a weight of the dispensing arm 211 can be reduced suitable for a high-speed operation. When the region in the longitudinal direction of d'1 is too long, not only rigidity of the dispensing arm 211 decreases, but also the liquid level detection sensor 215 cannot be mounted in the dispensing arm 211, and even if the liquid level detection sensor 215 can be mounted, a distance between the liquid level detection sensor 215 and the dispensing nozzle 213 increases, and a detection accuracy decreases. Therefore, it is desirable that the region in the longitudinal direction of d'1 is located closer to the dispensing nozzle 213 than an intermediate position between the dispensing nozzle 213 and the shaft 207. On the other hand, the length d2 in the lateral direction in the vicinity of a tip of the stirring arm is assumed to be d2≈D2 on an assumption that the stirring rod driving unit 216 is mounted in the vicinity of the tip of the arm, and stirring arm has a shape in consideration of the rigidity. The shape may be determined according to a size of a component of the stirring rod driving unit 216 to be mounted.

As described above, in the present embodiment, the dispensing arm 211 is not thinned as a whole, and a recess is formed on a side closer to the tip side where the dispensing nozzle 213 is located than the shaft 207 and on a side facing the stirring arm 212. Accordingly, not only the interference with the stirring arm 212 is avoided, but also the rigidity of the dispensing arm 211 is maintained, and a decrease in analysis performance is reduced. Although the stirring arm 212 may be provided with the recess, as described above, since structural rigidity of the stirring arm 212 is more obtained than that of the dispensing arm 211, it is desirable to form the recess only in the dispensing arm 211.

As a material for forming the dispensing arm 211 and the stirring arm 212 described above, a material such as a resin or aluminum that is lightweight and has sufficient mechanical strength is desirable. In particular, the material having high thermal conductivity, such as aluminum, can also serve as a heat transfer member that dissipates heat from a heating element, such as an actuator included in the stirring rod driving unit 216.

On the other hand, since the thermal conductivity of the resin is not generally higher than that of aluminum, the resin cannot be expected to serve as the heat transfer member. Therefore, when the resin is used as the material of the arm, a temperature of the heating element is likely to be high, and an operation of the motor as the actuator may be deteriorated, or a life of the motor may be shortened due to a lubricant being exhausted. Therefore, in the present embodiment, a heat transfer member 401 made of aluminum and extending in the longitudinal direction is disposed inside the resin member of the stirring arm 212, and one end of the heat transfer member 401 is attached to the stirring rod driving unit 216 as the heating element. Accordingly, even when the stirring arm 212 is covered with the resin member, heat of the motor is dispersed in the longitudinal direction via the heat transfer member 401, and the motor can be prevented from being locally heated. Further, when not only one end of the heat transfer member 401 is connected to the stirring rod driving unit 216, but also the other end of the heat transfer member 401 is connected to the metal shaft 208 having high thermal conductivity, the heat of the stirring rod driving unit 216 can be more effectively released to an outside.

The heat transfer member 401 preferably has a shape having a surface area as large as possible in order to increase a cooling capacity. The heat transfer member may be provided inside the dispensing arm 211 in consideration of an influence of heat generation in a base material of the liquid level detection sensor 215. Further, even when the actuator is configured with a solenoid instead of the motor, a configuration in which heat generated by the solenoid is released by the heat transfer member may be adopted.

Second Embodiment

FIG. 6 is a plan view showing a structure of the dispensing arm 211 and the stirring arm 212 in a second embodiment. In FIG. 6, rigidity of the dispensing arm 211 can be further increased as compared to the first embodiment. In the present embodiment, since a length of the arm in a longitudinal direction, which is d'1, is shorter than that in the first embodiment, rigidity of the dispensing arm 211 is increased. In addition, when the length of the arm in the longitudinal direction, which is d'1, is short, since a wide space in which components in the dispensing arm 211 can be disposed can be ensured, a degree of freedom in design can be increased such as bringing the liquid level detection sensor 215 closer to the dispensing nozzle 213.

Herein, the stirring arm 212 has a shape bent by θ degrees between the tip at which the stirring rod 214 is located and the shaft 208. Even when one arm is bent in this way, a recess is formed on a side of the one arm facing the other arm. When the bending angle is increased, the recess of the other arm can be omitted. However, the bending angle θ varies depending on an arrangement of each unit and the length of the arm, and in particular, in order to reduce a volume of the arm and to reduce an occupied space at a time of operation, it is desirable to set the bending angle θ to a value as close to 180 degrees as possible. In the present embodiment, the bent shape is formed by bending at one place, and a bent shape may be formed by being curved.

In each of the embodiments described above, an immune analyzer has been described as an example, and the invention can also be applied to other automatic analyzers. Examples of the applicable analyzers include, in addition to biochemical analyzers and gene analyzers, mass spectrometers used in clinical tests and coagulation analyzers for measuring a blood coagulation time. In addition to the analyzer, a sample pretreatment system for pretreatment of a biological sample may be used. In such a device, for example, instead of a dispensing unit for dispensing a sample or a reagent or a reagent stirring unit described in each embodiment, the invention can be applied to, for example, a unit including an arm for transporting a container containing the sample or the reagent even if use of the arm is different. Further, in each of the embodiments, a method for avoiding the interference between the two arms has been described, and the method can also be applied to avoid the interference among three or more arms, or between one arm and another structure.

REFERENCE SIGN LIST

101 sample container
102 sample transport unit
103 reagent container
104 reagent storage unit
105 sample dispensing unit
106 reagent dispensing unit
107 stirring unit
108 reaction promotion unit
109 measurement unit
110 sample aspiration position
111 consumable storage unit
112 consumable transport unit
113 reagent dispensing nozzle cleaning unit
114 stirring rod cleaning unit
115 control device
201 reagent discharge position
202 dispensing nozzle cleaning position
203 opening of reagent container
204 stirring rod cleaning position
205 dispensing nozzle movement path
206 stirring rod movement path
207 shaft (reagent dispensing unit)
208 shaft (stirring unit)
209 driving unit (reagent dispensing unit)
210 driving unit (stirring unit)
211 dispensing arm
212 stirring arm
213 dispensing nozzle
214 stirring rod
215 liquid level detection sensor
216 stirring rod driving unit
301 interference region
401 heat transfer member
402 heat transfer member

The invention claimed is:

1. An automatic analyzer, comprising:
a first reagent accommodation unit including a first reagent container with an opening on an upper side;
a second reagent accommodation unit including a second reagent container with an opening on an upper side;
a first shaft and a second shaft;
a first arm coupled to the first shaft at a proximal end of the first arm that rotates centering around the first shaft;
a dispensing nozzle coupled to a distal end of the first arm;
a first tip of the first arm extending to the upper side of the first reagent container;
a second arm coupled to the second shaft at a proximal end of the second arm that rotates centering around the second shaft; and
a stirring rod coupled to a distal end of the second arm;
a second tip of the second arm extending to the upper side of the second reagent container, wherein
the first reagent accommodation unit and the second reagent accommodation unit are positioned adjacent each other,
the first tip is configured to access the first reagent accommodation unit,
the second tip is configured to access the second reagent accommodation unit, a distance between the first shaft and the second shaft is shorter than a length of the first arm and of the second arm in a longitudinal direction, and a recess is formed on a side that is closer to the first tip of the first arm than the first shaft and that faces the second arm.

2. The automatic analyzer according to claim 1, wherein the recess is formed by narrowing a first tip side more than a first shaft side.

3. The automatic analyzer according to claim 1, wherein the recess is formed by bending a section between the first shaft and the first tip.

4. The automatic analyzer according to claim 1, wherein the first arm is coupled to an actuator and provided with the dispensing nozzle at the first tip to aspirate and discharge a reagent into the first reagent container, the second arm is coupled to an actuator and provided with the stirring rod at the second tip to stir a reagent in the second reagent container, and the dispensing nozzle and the stirring rod simultaneously disposed above and adjacent to upper sides of adjacent reagent containers among a plurality of the reagent containers including the first reagent container and the second reagent container that are arranged radially.

5. The automatic analyzer according to claim 4 further comprising:

a driving unit of the stirring rod; and a heat transfer member disposed within the second arm, wherein the second shaft and a driving unit of the stirring rod are connected by the heat transfer member.

\* \* \* \* \*